United States Patent [19]

Rothman et al.

[11] 3,919,275

[45] Nov. 11, 1975

[54] CHELATED BETA DICARBONYL COMPOUNDS

[75] Inventors: Edward S. Rothman, North Hills; Gordon G. Moore, Willow Grove, both of Pa.

[73] Assignee: The United States of America as represented by the Secretary of Agriculture, Washington, D.C.

[22] Filed: Jan. 12, 1973

[21] Appl. No.: 323,021

Related U.S. Application Data

[62] Division of Ser. No. 41,573, May 28, 1970, abandoned.

[52] U.S. Cl. ............ 260/438.1; 260/586; 260/596
[51] Int. Cl.² ......................................... C07F 1/08
[58] Field of Search ............ 260/438.1, 429 J, 596, 260/586

[56] References Cited

UNITED STATES PATENTS

| | | | |
|---|---|---|---|
| 2,208,253 | 7/1940 | Flenner et al. | 260/438.1 |
| 2,223,932 | 12/1940 | Towne | 260/438.1 X |
| 2,395,800 | 3/1946 | Boese et al. | 260/586 |
| 2,786,069 | 3/1957 | Kundiger et al. | 260/429 JX |
| 2,837,571 | 6/1958 | Conover | 260/438.1 X |
| 3,082,071 | 3/1963 | Hartle et al. | 260/438.1 X |
| 3,242,145 | 3/1966 | Martin | 260/429 X |
| 3,356,731 | 12/1967 | Nilsson | 260/438.1 X |

OTHER PUBLICATIONS

Moshier et al., Gas Chromatography of Metal Chelates, Pergamon Press, Oxford pp. 138 to 149.
Chemical Abstracts, Vol. 4, 15731b (1966).
J.A.C.S., Vol. 72, 3635–3642 (1950).

*Primary Examiner*—Helen M. S. Sneed
*Attorney, Agent, or Firm*—M. Howard Silverstein; Max D. Hensley; William E. Scott

[57] ABSTRACT

Beta dicarbonyl compounds are prepared by reacting an enol ester with aluminum chloride in the presence of an inert solvent at a temperature range of 20° to 50°C. An isopropenyl ester of an aliphatic fatty acid is used to prepare beta-diketone and a vinyl ester is used to prepare beta keto aldehyde. When reacted with any of several metals the dicarbonyl compounds form chelates.

2 Claims, No Drawings

CHELATED BETA DICARBONYL COMPOUNDS

A non-exclusive, irrevocable, royalty-free license in the invention herein described, throughout the world for all purposes of the United States Government, with the power to grant sublicenses for such purposes, is hereby granted to the Government of the United States of America.

This application is a division of application Ser. No. 41,573, filed May 28, 1970, now abandoned.

This invention relates to a novel and facile preparation of beta dicarbonyl compounds and more particularly to the isomerization of vinyl esters and the more deep-seated alteration of isopropenyl esters by means of aluminum chloride catalysis to form beta ketoaldehydes in the former instance and beta diketones in the latter instance.

The dicarbonyl compounds of this invention form useful complex salts of the type generally known as chelate compounds when reacted with any of several metals. The metallo-chelates are useful as catalysts. The dicarbonyl compounds are used as scavengers of metallic ions in processes such as ore concentration and separation of constituent metals. For example, the copper chelate derivatives of the diketones formed by the reaction of vinyl stearate with aluminum chloride are soluble in organic solvents and the copper chelates are separable by chromatography in benzene or chloroform solution on inorganic supports.

In general, according to this invention an isopropenyl ester of an aliphatic fatty acid, or alternatively a vinyl ester of an aliphatic fatty acid, is diluted with an inert hydrocarbon diluent and treated with 0.2 to 1.0 moles of anhydrous aluminum chloride at about from room temperature to 45°C., for about half an hour, after which the aluminum chloride is destroyed with aqueous dilute hydrochloric acid, and the products are isolated by solvent extraction. It is often convenient to convert the products to the copper chelates to facilitate the purification of product since the metal chelates are well-crystallized, sharp-melting compounds. Typically, the chelates are distinctly colored, e.g. distearoylmethane and dipalmitoylmethane are lilac colored, and formyl-stearoylmethane is blue-gray.

Side reactions are of no significance under the conditions of the reaction. It is to be emphasized that the diketone products are symmetrical diketones and not the derivatives RCO—CH$_2$ CO=CH$_3$ obtained by isomerizations previously reported [J. Org. Chem 31, 628(1966)].

The reaction of the isopropenyl esters is illustrated by the following equation:

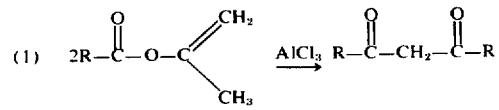

R = CH$_3$, C$_8$H$_{17}$, C$_{15}$H$_{31}$, C$_{17}$H$_{35}$

The chelate formation is illustrated for distearoyl methane in equation 2;

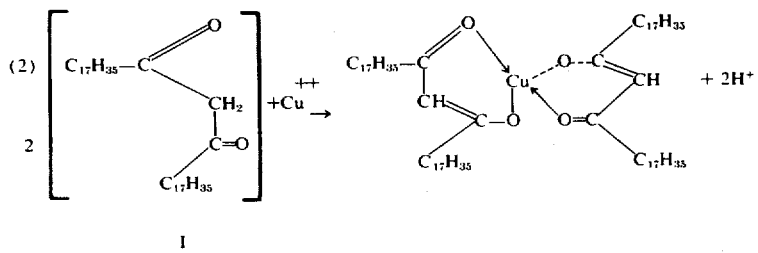

In our experience the similar reaction of e.g. vinyl stearate gives not only the expected beta keto aldehyde II, but also, distearoylmethane I, see equation 3.

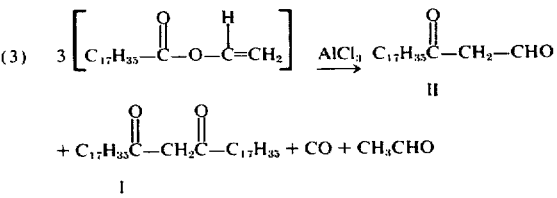

The advantages of the present invention include the simplicity of the route whereby valuable diketones are obtained in a single step from vinyl and isopropenyl esters, and a process that is generally applicable with enol esters from that of acetic acid (C$_2$) to that of stearic acid (C$_{18}$) without the need of high temperatures or vapor phase conditions.

The following examples illustrate the invention but are not intended to have a limiting effect on its scope.

EXAMPLE I

Distearoylmethane (heptatriacontane -18,30-dione)

Isopropenyl stearate, 19 g., (0.06 mole) in 25 ml. of hexane was treated with aluminum chloride, 8.5 g., (0.06 mole) with occasional cooling in a waterbath to keep temperature below 40°C. After stirring 0.5 hr. at 40°C. the mixture was poured into a mixture of dilute hydrochloric acid and methylene chloride to destroy the catalyst and extract the product. After separation of the organic layer and evaporation of the methylene chloride the diketone was crystallized directly from methanol to give white plates m.p. 77.3°–77.8°, UV max. (isooctane) 273 mµ (E = 12000), ir 6.24µ (chloroform), NMR 3.54, 5.41δ. The copper chelate derivative was prepared by mixing hot alcoholic solutions of the diketone and cupric acetate. Crystallization of the lilac-colored crystalline product gave the chelate m.p. 113.2°–114.0°C. The chelate may be reconverted to the free diketone by shaking its chloroform solution with dilute aqueous hydrochloric acid and evaporating the chloroform layer.

EXAMPLE II

Dipalmitoylmethane

Vinyl palmitate, 145 gram (0.51 mole) dissolved in 400 mls of olefin-free hexane was heated, portionwise with 85 g. (0.6 mole) of anhydrous aluminum chloride added at such a rate that the evolved heat did not allow the temperature to rise more than about 30°C. The mixture was then refluxed for an hour, cooled, and poured into a mixture of 1 liter of water, 300 ml. of concentrated hydrochloric acid and 1.5 l. of methylene chloride. The methylene chloride layer was separated (methanol assisted in controlling emulsion problems) dried, and the solvent was evaporated. The residue, dissolved in hot ethanol, was treated with hot aqueous cupric acetate in slight access whereupon 120 g. of mixed copper chelates separated and were collected on a filter. Chromatography on magnesium silicate gave via hot benzene elution 50 g. of the lilac colored copper chelate derivative of dipalmitoylmethane m.p. 113°-114°C., infrared maxima (in chloroform) at 1405 and 1560 waves per centimeter. Further elution with 1:1 methylene chloride/ether gave the blue colored copper chelate derivative of formylpalmitoylmethane m.p. 106°-108°C.

EXAMPLE III

In a manner similar to Example I, isopropenyl octanoate was converted to dioctanoyl methane m.p. 20°-21°C., UV 274 m$\mu$ (isooctane) (E=11,000), copper chelate derivative, m.p. 110.2°-110.7°C., ir 1350, 1410, 1458, 1554 cm$^{-1}$ (CHCl$_3$).

EXAMPLE IV

In a manner similar to example II vinyl laurate was converted to dilauroylmethane; copper chelate, m.p. 107°-109°C.; and to lauroylformylmethane, copper chelate m.p. 100°-102°C.

EXAMPLE V

In a manner similar to example II vinyl stearate was converted to distearoylmethane m.p. 72°C. (copper chelate derivative m.p. 114°C.) and stearoylformylmethane m.p. 58°-60°C. (copper chelate m.p. 128°-129°C.)

We claim:
1. The copper chelate of lauroylformylmethane.
2. The copper chelate of stearoylformylmethane.

* * * * *